United States Patent [19]
den Boer et al.

[11] Patent Number: 6,008,872
[45] Date of Patent: Dec. 28, 1999

[54] HIGH APERTURE LIQUID CRYSTAL DISPLAY INCLUDING THIN FILM DIODES, AND METHOD OF MAKING SAME

[75] Inventors: Willem den Boer, Plymouth; John Z. Z. Zhong, Novi; Vijayen S. Veerasamy, Northville; Yiwei Lu, Ann Arbor, all of Mich.

[73] Assignee: OIS Optical Imaging Systems, Inc., Northville, Mich.

[21] Appl. No.: 09/041,743

[22] Filed: Mar. 13, 1998

[51] Int. Cl.$^6$ .................................................. G02F 1/1335
[52] U.S. Cl. .............................. 349/106; 349/50; 349/51; 349/52
[58] Field of Search ................................. 349/106, 50, 51, 349/52

[56] References Cited

U.S. PATENT DOCUMENTS

| | | |
|---|---|---|
| 4,731,610 | 3/1988 | Baron et al. . |
| 5,142,390 | 8/1992 | Ohta et al. . |
| 5,490,002 | 2/1996 | Nicholas ................................... 349/51 |
| 5,521,731 | 5/1996 | Fukuyama et al. . |
| 5,576,728 | 11/1996 | Maeda . |
| 5,641,974 | 6/1997 | den Boer et al. . |
| 5,715,026 | 2/1998 | Shannon . |
| 5,719,647 | 2/1998 | Fujikawa et al. . |

FOREIGN PATENT DOCUMENTS

| | | |
|---|---|---|
| 0217466 | 4/1987 | European Pat. Off. . |
| 0434627 | 6/1991 | European Pat. Off. . |
| 2605778 | 10/1986 | France . |
| 4-253028 | 9/1992 | Japan ..................................... 349/106 |
| 2217891 | 1/1989 | United Kingdom . |

OTHER PUBLICATIONS

"A Two–Diode Pixel Circuit and Addressing Method for MIM LCDs" by den Boer, Proceedings Euro Display '96, Oct. 1996.

Bahadur, Liquid Crystals: Applications And Uses, vol. 1, pp. 420–421, 1990.

*Primary Examiner*—James A. Dudek
*Attorney, Agent, or Firm*—Joseph A. Rhoa

[57] ABSTRACT

A backlit transmissive liquid crystal display including non-linear resistive thin film diodes (TFDs). Select address lines on the active substrate provide both conventional address line functionality, as well as acting as one of the electrodes for each thin film diode. Two such diodes are provided in each pixel in certain embodiments. Still further, black matrix material is provided between the aforesaid address line material and the substrate so as to form rows of stacks on the active substrate. The thin film diode semi-insulating material, the address line material, and the black matrix material are patterned together in a single step to form elongated rows (or columns) on the active substrate. In such a manner, the display has reduced ambient light reflections, and reduce photosensitivity. Furthermore, because the pixel electrode, which also functions as the top TFD electrode in each pixel, overlaps both the select lines and portions of the color filter, a high pixel aperture ratio of at least about 70% is provided. The TFDs may be MIM diodes in certain embodiments.

19 Claims, 7 Drawing Sheets

HIGH APERTURE LIQUID CRYSTAL DISPLAY INCLUDING THIN FILM DIODES, AND METHOD OF MAKING SAME

RELATED PATENTS AND APPLICATIONS

This application relates to commonly owned U.S. Ser. Nos. 09/023,451, filed Feb. 13, 1998; 08/935,678, filed Sep. 23, 1997; and 08/908,803, filed Aug. 8, 1997, the entire disclosures of which are hereby incorporated herein by reference.

This invention relates to a twisted nematic liquid crystal display (LCD). More particularly, this invention relates to a liquid crystal display that is driven by thin film switching diodes, and a method of making same. Such diodes are preferably non-linear resistance elements, and may be MIM diodes.

BACKGROUND OF THE INVENTION

A pixel in a liquid crystal display (LCD) generally includes a pair of spaced apart pixel electrodes having liquid crystal material disposed therebetween. Thus, each pixel constitutes a capacitor in which electric charge can be stored. The charge stored in a pixel results in a voltage potential across the opposing electrodes and an electric field across the liquid crystal (LC) material. By controlling the amount of charge stored in pixels across an array of such pixels, the properties of the liquid crystal (LC) material can be controlled to obtain a desired light influencing effect or image which is displayed to a viewer.

In LCDs, it is necessary to update the condition of each pixel at a regular interval (i.e. at a given frame rate). This is because pixels can retain or store applied charge potentials for only a finite time. Updating is further required in order to change the image to be displayed to the viewer. The ability to rapidly transfer to, and store electric charge in, pixels and to efficiently retain the stored charge therein for a frame period is thus important.

Metal-insulator-metal (MIM) and other non-linear resistant diode LCDs are easier to manufacture than TFT LCDs and conventional diode LCDs. A typical MIM electronic matrix array requires between two and four thin film layers and photomask steps, as compared to six to nine thin film layers and photomask steps for TFT arrays. Patterning of most MIM arrays can be achieved with less stringent overlay accuracy and resolution requirements, than is required for TFT arrays. As a result, less expensive photoexposure equipment, such as scanning projection aligners, can be used, that have more than twice the throughput and cost less than half as much as flat panel steppers. Despite their low production costs, MIM and other non-linear resistive thin film diode driven LCDs are not widely used. This can be attributed to the inferior performance of typical MIM LCDs with regard to gray shade control, image retention, response time, and maximum size and resolution as compared to TFT LCDs.

Accordingly, there exists a need in the art for an improved backlit thin film diode (e.g. MIM) LCD, which is cheaper to manufacture, less susceptible to image retention and gray scale problems, has high transmission, and has good resolution.

Furthermore, conventional backlit dual MIM VGA LCDs have a pixel aperture ratio of about 50% (e.g. for a 10.4" VGA LCD). There exists a need in the art for a higher pixel aperture ratio in backlit transmissive thin film diode (TFD) LCDs.

Still further, reflectance characteristics under ambient lighting of conventional backlit MIM LCDs is less than desirable, and may not be sufficiently low for automotive applications. Thus, there exists a need in the art for a thin film diode inclusive backlit LCD which has reduced ambient reflectance under ambient lighting conditions.

Yet another problem with conventional silicon nitride MIM LCDs is their rather high amount of photosensitivity due to the MIM devices. High photosensitivity can limit contrast ratio in certain applications. Thus, there exists a need in the art for a thin film diode (TFD) inclusive LCD having reduced photosensitivity.

As shown in prior art FIG. 1, another problem with conventional MIM devices is breakdown voltage of MIM is device at the edge(s) of the bottom electrode. This is currently limited by the step coverage of the semi-insulator layer over the edge of the bottom electrode and the thickness and profile of the bottom electrode and the thickness of the semi-insulator. In this conventional FIG. 1 thin film diode, the $SiN_x$ (silicon nitride) semi-insulator or insulator layer makes a step over the edge of the bottom electrode. This is a weak point in the TFD where destructive breakdown can occur at high voltage, i.e. the device is sensitive to ESD and cannot always operate reliably at desired select voltages. This step coverage can be a problem, and it is desirable for this problem to be solved.

Yet another problem with conventional backlit MIM LCDs is the large number of processing steps needed to make the complete display, including both the active and passive substrates. The MIM devices are on the active substrate, and require a number of processing steps. Meanwhile, the color filters are on the passive or opposite substrate, and also require a number of processing steps to manufacture. The combination of steps required to make both plates (i.e. substrates) is undesirably large. Accordingly, there exists a need in the art for a liquid crystal display including a method of making same having a reduced number of processing steps.

U.S. Pat. No. 5,521,731 discloses a reflective type liquid crystal display (LCD) which is driven by an array of MIM diodes. There is no backlight. For each of the MIM diodes, the lower diode electrode functions as a wiring element. Unfortunately, the display of the '731 patent is undesirable for at least the following reasons: (i) the color filters and MIM diodes are on opposite substrates thereby increasing the number of processing steps necessary to make the display; (ii) the display is a reflective type display (without a backlight) and thus non-transmissive [reflective LCDs generally have poorer image quality than backlit transmissive LCDs]; (iii) no black matrix for reducing reflections in ambient conditions is provided; (iv) certain embodiments utilize cholesteric liquid crystal; (v) only one MIM is provided per pixel which results in inferior image quality; (vi) an extra insulating layer is required between the MIMs and the pixel electrodes, which increases the number of steps needed to make the display; and (vii) the pixel electrodes associated with the MIMs are of an opaque reflective non-transparent material such as aluminum which would be undesirable in a transmissive display.

It is a purpose of this invention to fulfill the above-described needs in the art, as well as other needs which will become apparent to the skilled artisan from the following detailed description of this invention.

SUMMARY OF THE INVENTION

Generally speaking, this invention fulfills the above-described needs in the art by providing in a liquid crystal display including a first substrate, a second substrate, a liquid crystal layer disposed between the first and second substrates, and a plurality of pixels for displaying an image to a viewer, the improvement comprising:

at least one of the pixels including a first discrete thin film diode and a color filter disposed on the second substrate, wherein the first discrete thin film diode includes a first electrode, a second electrode, and a semi-insulator layer disposed between the first electrode and the second electrode; and wherein said color filter has a first contact hole defined therein which defines the area of the thin film diode, and a pixel electrode in the at least one pixel being in electrical communication with the first thin film diode through the first contact hole.

This invention further fulfills the above described needs in the art by providing a method of making an active play for a display, the method comprising the steps of:

providing a first substrate;

depositing a plurality of black matrix layers on the first substrate;

depositing a conductive metal layer on the first substrate over the plurality of black matrix layer;

depositing a semi-insulating layer on the first substrate over the conductive metal layer and over the plurality of black matrix layers;

using at least one mask, patterning the plurality of black matrix layers, the conductive metal layer, and the semi-insulating layer into a first stack;

depositing a substantially continuous color filter layer on the first substrate so that the first stack is disposed between the first substrate and a portion of the color filter layer;

patterning the color filter layer to form at least one color filter for a pixel for which the first stack is provided, the patterning also forming the color filter so that the color filter has a first contact hole defined therein over the first stack so as to expose a portion of the first stack; and depositing a substantially transparent conductive layer on the first substrate and patterning the substantially transparent conductive layer into at least one pixel electrode which electrically communicates with the first stack through the first contact hole defined in the color filter.

This invention will now be described with reference to certain embodiments thereof as illustrated in the following drawings.

IN THE DRAWINGS

FIG. 5 only shows the active substrate (not the passive substrate), and may be driven by either the FIG. 3 or FIG. 4 drive schemes.

DETAILED DESCRIPTION OF CERTAIN EMBODIMENTS OF THIS INVENTION

Figure 1:
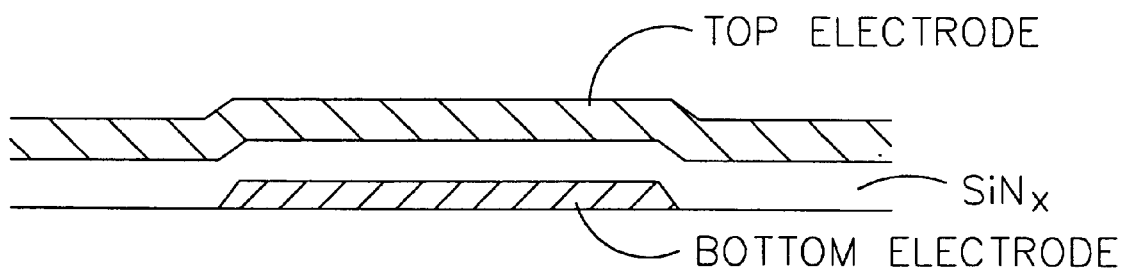
FIG. 1 is a side cross-sectional view of a conventional MIM or TFD diode, illustrating the bottom electrode, top electrode, and semi-insulating material provided therebetween.

Referring now more particularly to the accompanying drawings in which like reference numerals indicate like parts throughout the several views.

Figure 2:
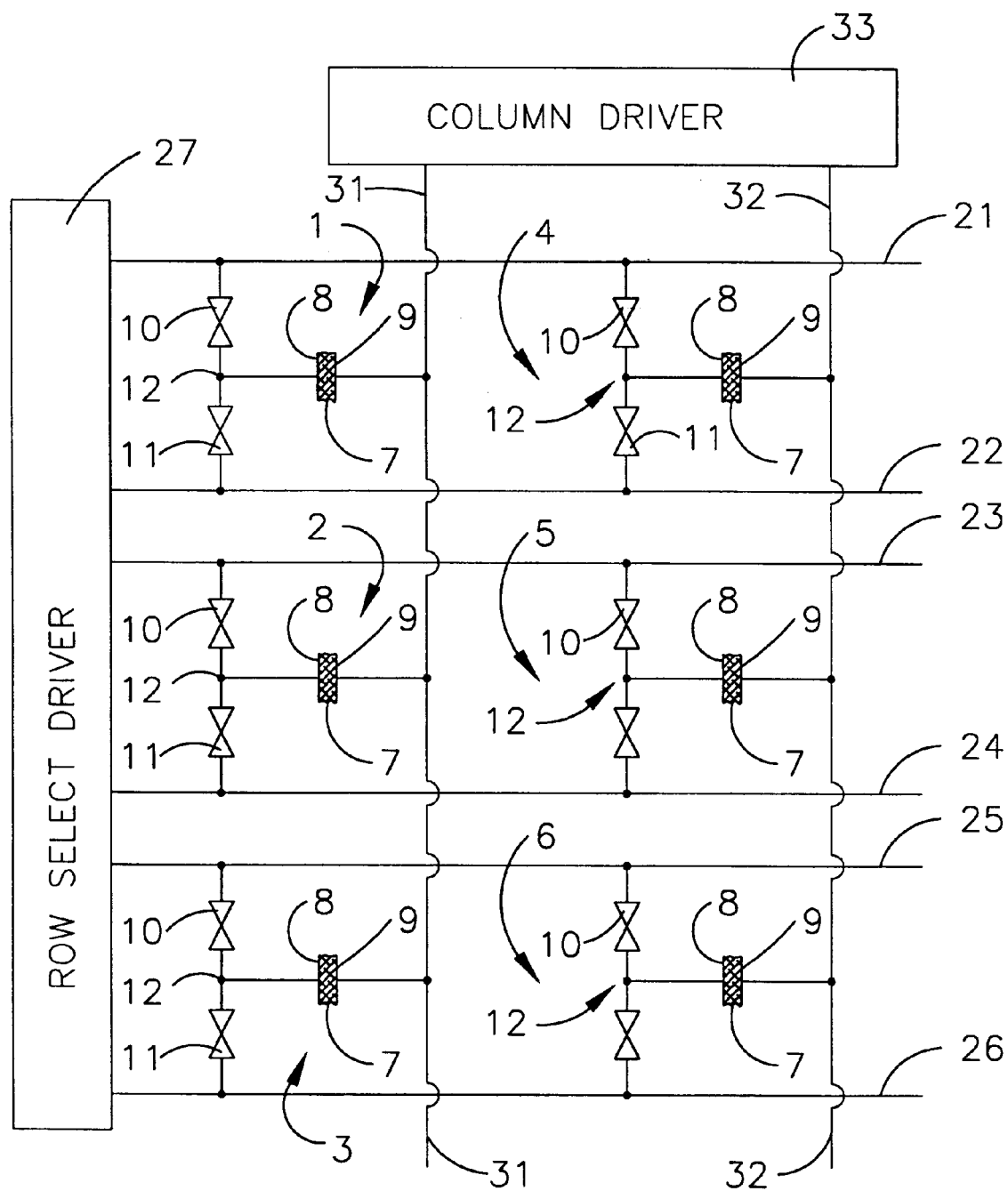
FIG. 2 is a schematic circuit diagram of an active matrix liquid crystal display (AMLCD) including a thin film diode (e.g. MIM diode) drive scheme according to an embodiment of this invention.

FIG. 2 is a schematic circuit diagram of an AMLCD according to an embodiment of this invention. The AMLCD includes a plurality of pixels 1–6 arranged in a matrix array on the active substrate of the display. Pixel 1 includes twisted nematic liquid crystal layer 7 sandwiched between individual active plate pixel electrode 8 and passive plate pixel electrode 9, as well as thin film diodes (e.g. MIM diodes) 10 and 11 which are coupled to one another and to pixel electrode 8 via common node 12. Each thin film diode (TFD) is of the non-linear resistance type and each TFD 10, 11 is a bidirectional threshold device. Common node 12 is in communication with each of the diodes 10, 11 via branches extending therefrom, as well as with pixel electrode 8. In certain embodiments of this invention, as will be described below, pixel electrode 8 is formed of a substantial transparent conductive layer (e.g. ITO) which also makes up one of the electrodes of each of thin film diodes 10, 11. Each of the other pixels 2–6 also include a pair of thin film diodes (e.g. MIM diodes) 10, 11 coupled at a common node 12, as well as LC material 7 sandwiched between pixel electrodes 8 and 9. The data pixel electrode 9 in each pixel is on the passive substrate (not on the same substrate as diodes 10, 11) and is in electrical communication with a column or data line 31, 32 which is also on the passive plate.

The FIG. 2 display further includes row or select address lines 21–26 that are driven and selected by row select driver 27, and column or data address lines 31 and 32 which are selected and driven by column driver 33. Select lines 21–26 are all substantially parallel to one another and are oriented in a first direction, while data lines 31–32 are also substantially parallel to one another, but are oriented in a second direction that crosses with and is substantially orthogonal to the first direction. Thus, select lines 21–26 are substantially orthogonal to data lines 31–32 across the array, and are on opposite substrates of the LCD.

As illustrated in FIG. 2, in certain embodiments, a pair of row or select lines (e.g. 21–22) is provided for each pixel, while only a single column or data line (e.g. 31) is utilized for each pixel. While in preferred embodiments of this invention, two TFDs 10, 11 are provided for addressing each pixel, it will be appreciated by those of skill in the art that drive schemes using only one TFD per pixel may also be used in alternative embodiments.

Although only six pixels are illustrated in FIG. 2, it is to be understood that the AMLCD includes additional pixels as well as additional select and data address lines sufficient in number so as to form a useable image for displaying to a viewer. Each of pixels 1–6 herein is substantially identical, except for potentially the presence of a different colored filter in each pixel. For example, pixels 1 and 3 may have red color filters therein, pixels 2, 4, and 6 green color filters therein, and pixel 5 a blue color filter therein.

The insulator or semi-insulator layer 54 (see FIG. 7) in diodes 10, 11 may be tantalum oxide ($Ta_2O_5$), silicon rich silicon nitride ($SiN_x$) grown by plasma enhanced chemical vapor deposition, carbon nitride alloy, or the like, according to different embodiments of this invention. Layer 54, together with opposing electrodes 8 and 53, make up TFDs 10, 11 in each pixel. $SiN_x$ diodes have steeper current voltage characteristics than $Ta_2O_5$ diodes and a lower diode capacitance. Thus, $SiN_x$ diodes are attractive for higher resolution displays. However, $SiN_x$ diodes suffer from device degradation and spacial non-uniformity. The pixel circuits described in certain embodiments are thus designed so as to have greatly increased tolerance for spacial and temporal variations of diode current-voltage characteristics, as $SiN_x$ MIM diodes are preferred in some embodiments thin film diode insulating layer 54 may also be of carbon nitride alloy, nanocrystalline carbon, or of polycrystalline carbon in certain embodiments of this invention. In certain embodiments, insulating or semi-insulating layer 54 is substantially transparent to visible light. When semi-insulating or insulating layer 54 includes amorphous carbon nitride alloy, from about 20–60% of the atoms in the alloy are nitrogen atoms, from about 40–80% of the atoms in the alloy are carbon atoms, and from about 0–25% atoms in the alloy are hydrogen atoms. Such a carbon nitride alloy may have a hardness of at least about 50 Gpa, and most preferably has a hardness of at least about 70 Gpa, and also the electrical resistivity of the carbon nitride alloy which makes up layer 54 is from about $5 \times 10^7$ of $2^7 \times 10^{12}$, and also the carbon nitride alloy which makes up layer 54 may have a dielectric constant of less than about 4.0.

A row of pixels (e.g. pixels 1 and 4 in FIG. 2) may be selected by applying simultaneous opposite polarity pulses to select lines 21 and 22 while at the same time applying data voltage to the column lines in that particular row as desired. The polarity of the voltage pulses on any given select line remains constant for that line. In other words, on select line 21, for example, the polarity of pulses thereon will always be positive in a frame while the polarity of pulses on the corresponding select line 22 will always be negative. This allows for less complex circuitry to be utilized. In certain embodiments, this may be the case with all pixels disclosed herein.

Figure 3B:
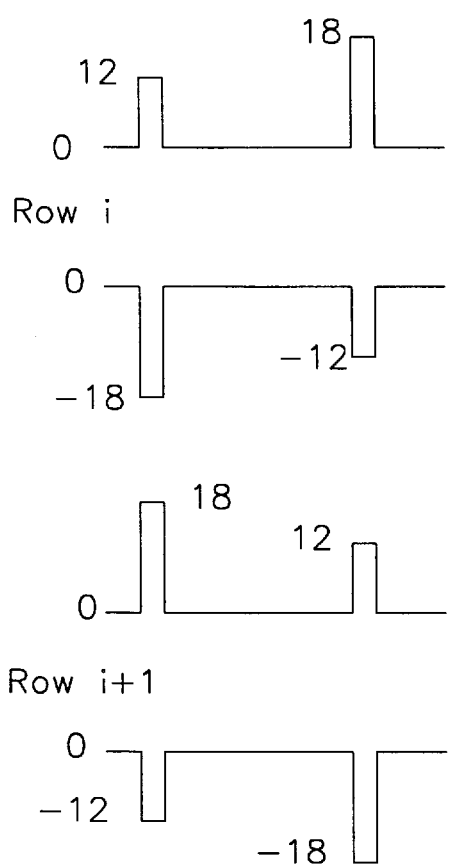
FIG. 3(b) illustrates four separate voltage versus time graphs which correspond to the four select lines illustrated in FIG. 3(a) (i.e. how the FIG. 3(a) pixels are driven during operation).
Figure 3A:
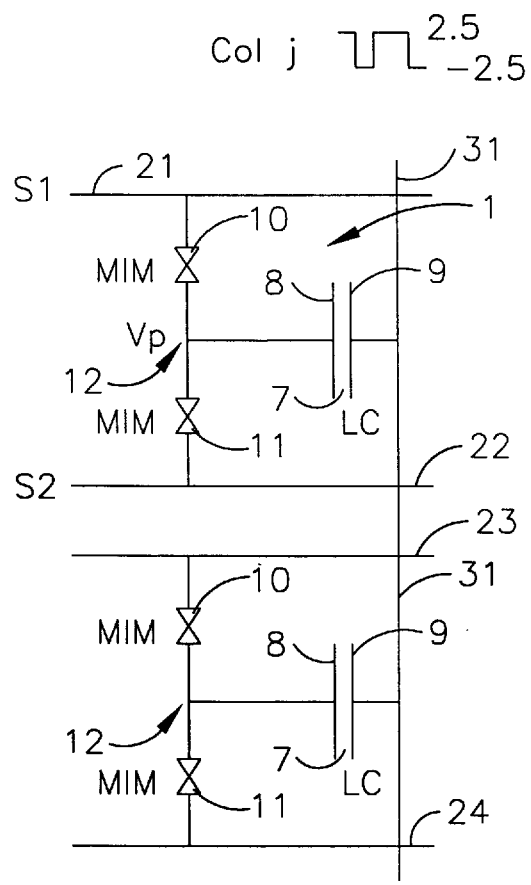
FIG. 3(a) is a circuit diagram of two different pixels in the FIG. 2 display, in a given column on different rows, according to a first embodiment of this invention.

Referring now to a first embodiment of this invention shown in FIGS. 2 and 3(a)–3(b) where two TFDs 10, 11 are provided for addressing each pixel. In the FIGS. 3(a)–3(b) embodiment, the select voltage on one select line is alternated between $V_s+V_{offset}$ and $V_s-V_{offset}$ for subsequent frames, while alternating the select voltage on the other corresponding select line between $-V_s+V_{offset}$ and $-V_s-V_{offset}$. In the FIG. 3(b) example, $V_s=15$ volts and $V_{offset}=3$ volts. The data voltage swing on line 31 is thus reduced to 5 volts ($V_d$ or the data voltages varies between –2.5 and +2.5 volts in this example). Vs may range from about 10–30 volts, while $V_{offset}$ may range from about 2–4 volts. In this simultaneous offset scan ripple drive embodiment, the maximum voltage across each diode 10, 11 in the off-state is about 7–8 volts, resulting in improved charge retention of the LC capacitance in each pixel. The cancellation of the pixel voltage shift from the two diodes is not complete in this drive scheme, because the opposite polarity pulses on lines 21 and 22, for example, are not of equal magnitude.

The data voltage may be applied in row inversion mode (e.g. the polarity across the LC is changed for each subsequent row in a given frame). Thus, for example, in row inversion, at node 12 of each pixel in a particular row, the voltage at node 12 will be greater than the voltage at the opposing pixel electrode 9 in the same pixel in a given frame, and for another row in the display, the voltage at each pixel node 12 will be less than the voltage at the opposing electrode 9. Thus, in row inversion, a first row of pixels in the display is driven at a particular polarity across the liquid crystal layer and another row of pixels in the display is driven at a different polarity in the same frame. In certain embodiments, in a given frame the polarity across the LC can alternate from row to row. Each pixel changes polarity in subsequent frames.

Still referring to the FIGS. 3(a)–3(b) embodiment, pixel 1, for example, is driven as follows. A pulse of $V_s-V_{offset}$ (e.g. 15–3=12 volts) is applied to select line 21, while simultaneously a pulse of $-V_s-V_{offset}$ (e.g. –15–3=–18 volts) is simultaneously applied to select line 22, while at the same time a data voltage of 2.5 volts is applied to column line 31. This charges the LC 7 capacitance of the pixel. When diodes 10, 11 are switched off, node 12 floats and follows the column line voltage so that, for example, if –2.0 volts are applied to column line 31, the voltage at node 12 goes to –8 volts, while select line 21 and 22 are at 0 volts. This allows less leakage through diodes 10, 11. Still referring to FIGS. 3(a)–3(b) in the next frame, a voltage of $V_s+V_{offset}$ (e.g. 18 volts) is applied to select line 21 while a voltage of $-V_s+V_{offset}$ (e.g. –12 volts) is simultaneously applied to select line 22, while a data voltage of from about –3 to +3 volts (V) is applied to column line 31. Each pixel in the row is driven in a similar manner.

Figure 4B:
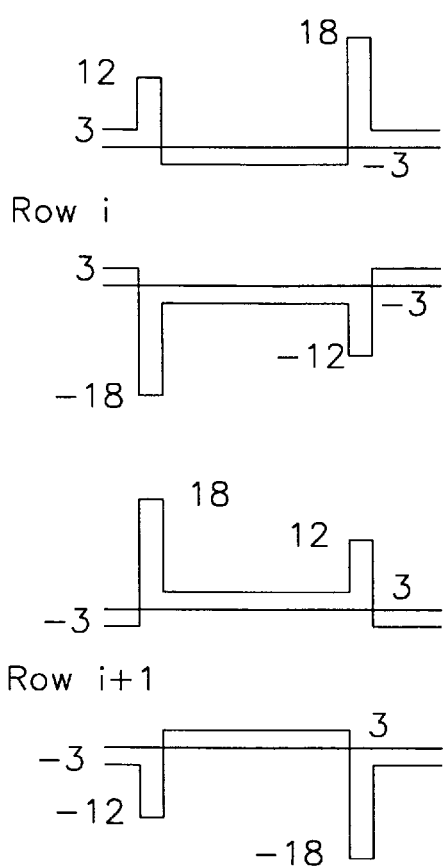
FIG. 4(b) illustrates four separate voltage versus time graphs which correspond to the four select lines in the FIG. 4(a) embodiment, according to the second embodiment of this invention.
Figure 4A:
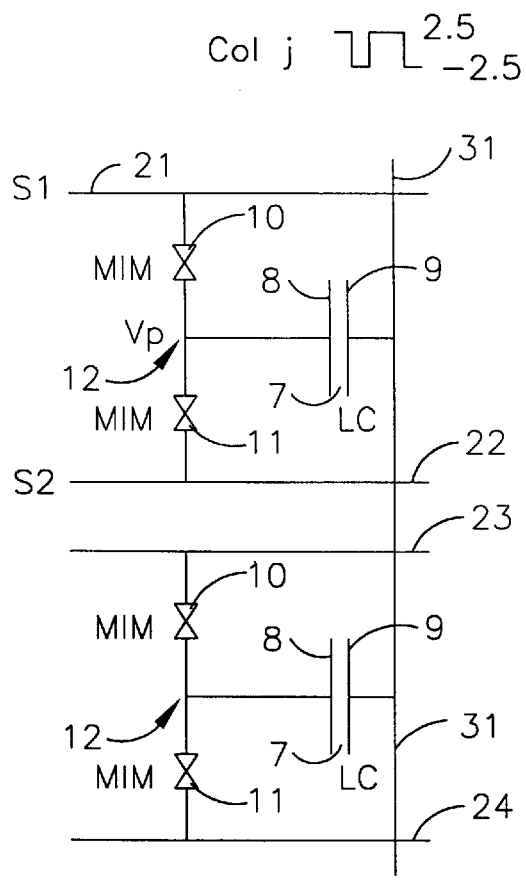
FIG. 4(a) is a circuit diagram of two different pixels of the FIG. 2 display, in a given column on different rows, according to a second embodiment of this invention.

Referring now to the FIGS. 4(a)–4(b) embodiment of this invention, holding voltages are provided during the non-select periods, as shown in FIG. 4(b). In this simultaneous offset scan holding voltage embodiment, the maximum voltage across each TFD 10, 11 in the offset is further reduced to about 5 volts, improving charge retention on the liquid crystal material 7 in each pixel. The holding voltages are maintained in select lines 21 and 22, respectively, across frame thresholds and until the next selection pulse.

Figure 5:
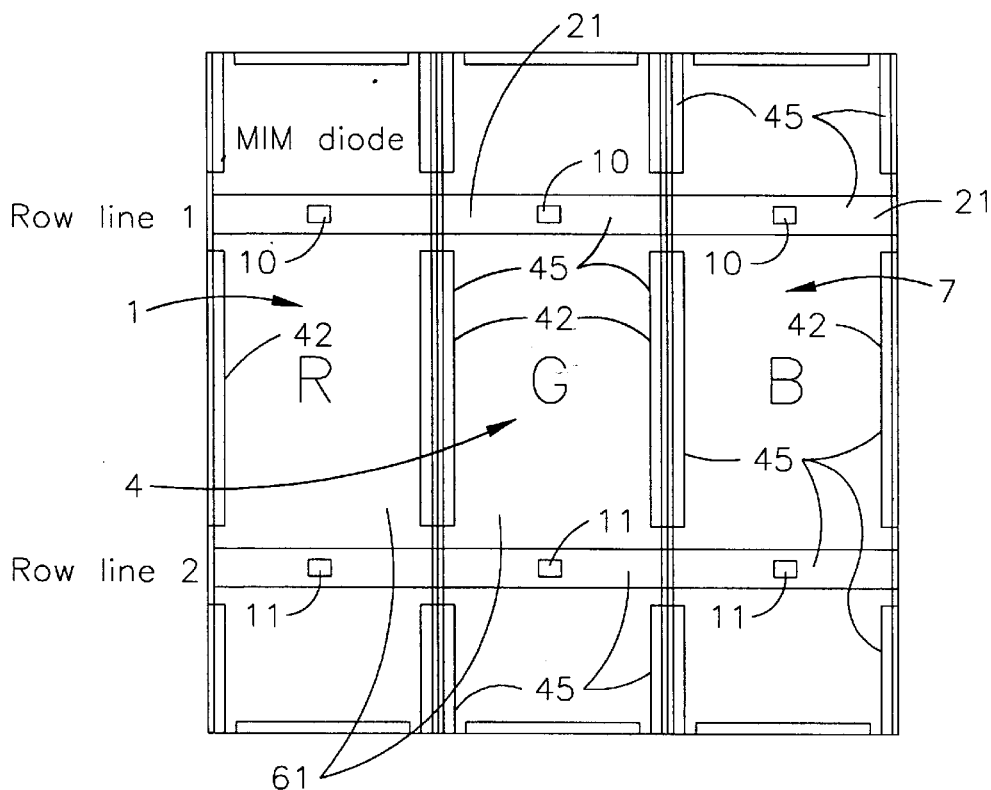
FIG. 5 is a top plan view of the active plate for a red pixel, a green pixel, and a blue pixel, all aligned in one row, of the display of FIG. 2, wherein each pixel includes two thin film diodes for driving same.
Figure 7:
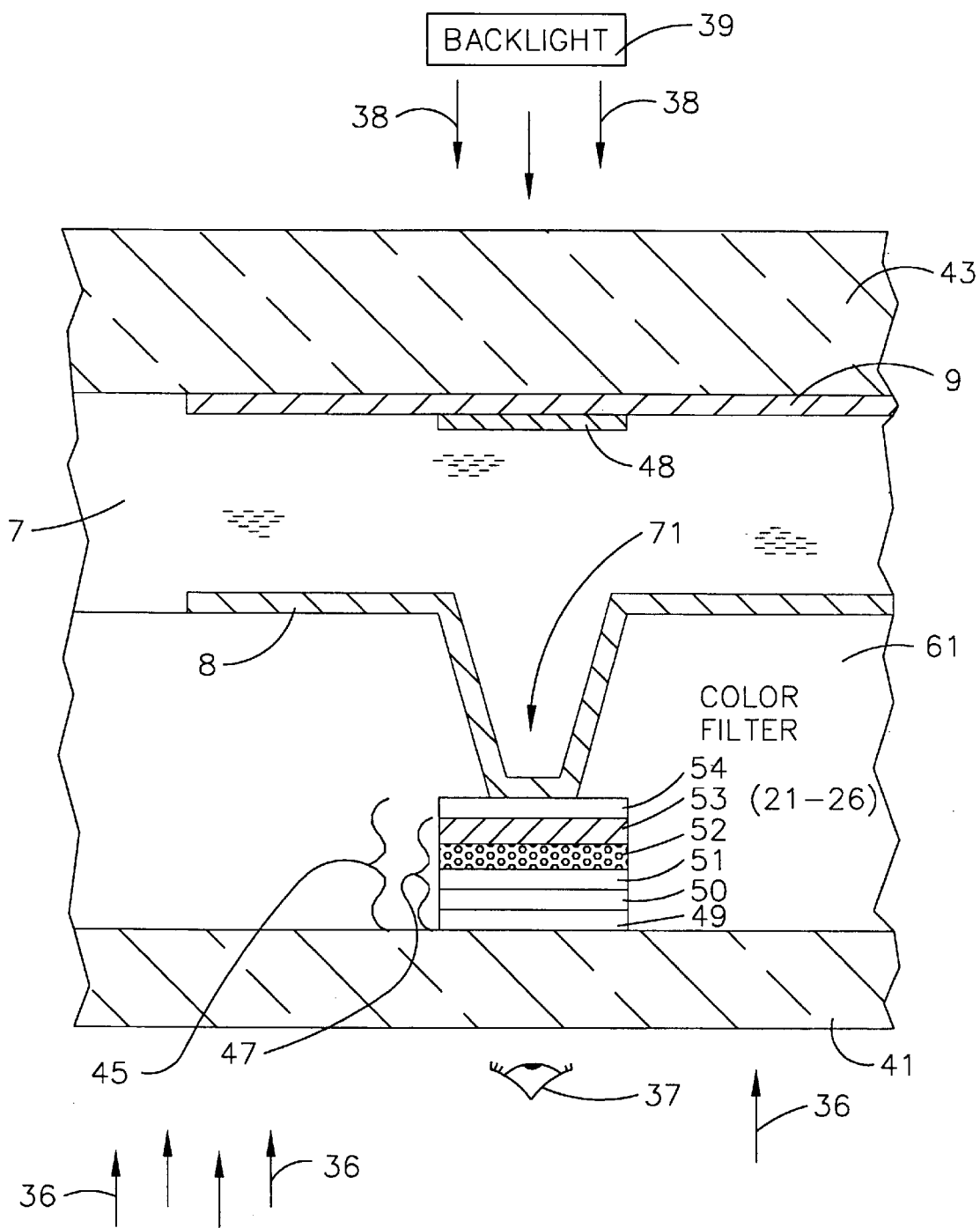
FIG. 7 is a side cross-sectional view of a thin film diode in part of a pixel of the liquid crystal display of FIGS. 2–6, illustrating the liquid crystal material disposed between the active substrate upon which the diode is disposed, and the passive substrate.

FIG. 5 illustrates the active plate for a plurality of pixels 1, 4, and 7 in the display of FIG. 2. Each pixel 1, 4, and 7 in FIG. 5 includes a pair of thin film diodes 10, 11 for driving same. Select line 21 is electrically connected to diode 10 in each of the three illustrated pixels, while select line 22 is operatively and electrically connected to diode 11 in each of the three illustrated pixels. As shown, pixel 1 includes a red color filter on the active plate between the pixel electrode 8 and the substrate. Pixels 4 and 7 are the same, except that the filter in pixel 4 is green and the filter in pixel 7 is blue. As shown in FIG. 5, the select address lines 21–26 are aligned in parallel rows. Also, elongated black matrix portions 42 are located in between the color filters 61 on the active substrate. Each such select line 21–26 and portion 42 is composed of a stack 45 as shown in FIG. 7. Color filter 61 in red pixel 1 may be of a material such as Fuji Red™, available from Fuji, while color filter 61 in green pixel 4 may be of material such as Fuji Green™, available from Fuji, and the color filter 61 in blue pixel 7 may be of Fuji Blue™, also available from Fuji. The materials for each of these color filters have a dielectric constant value less than about 5.0, preferably less than about 3.5, and are photoimageable. The low dielectric constant values allow the color filter 61 to reduce crosstalk in the display and act as superior insulators between pixel electrode 8 and overlapped address lines 53 in non-TFD areas.

Figure 6:
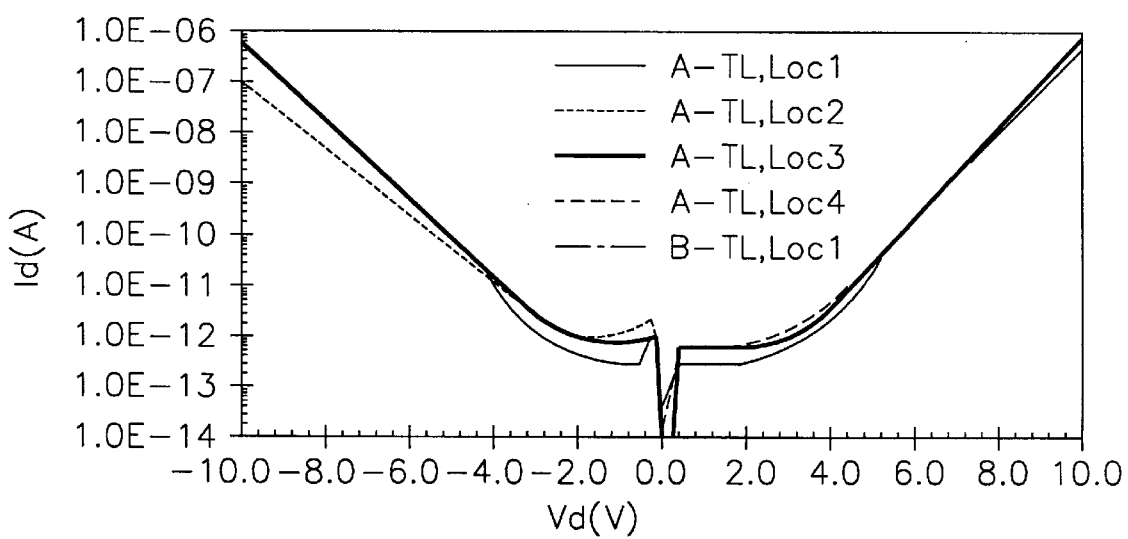
FIG. 6 is a current (vertical axis) versus voltage (horizontal axis) graph of a thin film diode structure according to the FIGS. 2, 5, and 7 embodiment of this invention, showing excellent on/off ratios and good uniformity for five different TFDs.

FIG. 6 is a graph illustrating electrical characteristics of certain TFD devices 10, 11 of FIGS. 1, 5, and 7. As shown, the diodes 10, 11 have symmetric current/voltage characteristics and excellent on/off ratios, as well as good uniformity. The bottom TFD electrode of a refractory metal, such as MoTa, rather than of ITO, makes the TFD also more stable and substantially eliminates the problem of reduction or ITO in a hydrogen-containing plasma.

FIG. 7 is a side cross-sectional view of a portion of one of the pixels of the display of FIGS. 2–6, this portion shown in FIG. 7 including a thin film bidirectional diode made up of elements 53, 54, and 8, color filter 61, substantially transparent pixel electrode 8 provided on active substrate 41, and pixel electrode 9 provided on passive substrate 43. Backlight 39 emits visible light rays 38 toward the back of the display, such light rays passing through rear or passive substrate 43, LC layer 7, and active substrate 41 before portraying an image to viewer 37. LC layer 7 may be from about 4 to 5 $\mu$m thick in certain embodiments, while color filter layer 61 on the substrate may be from about 1–3, preferably about 2 $\mu$m thick. Ambient visible light 36 which impinges upon the display from the surrounding environment in ambient environments (e.g. in daylight in an automobile), comes from the viewer 37 side of the display and first hits active substrate 41 before reaching the other illustrated display components. Each of substrates 41 and 43 may be made of glass, plastic, or the like, and each substrate is preferably substantially transparent to visible light rays.

As shown in FIG. 7, stack 45, provided on or supported by active substrate 41, includes low reflectance dielectric black matrix system 47 including layers 49, 50, 51, 52, and 53; opaque and reflective select line (21–26) conductive layer 53, and insulator or semi-insulator layer 54 for the diode 10, 11. Low reflectance stack 47, which corresponds to the buslines 21–26, minimizes specular display surface reflectance from ambient light 36, when the active plate is facing the viewer.

The diode 10, 11 in FIG. 7 is made up of bottom diode electrode 53, upper diode electrode 8 (which also functions as the pixel electrode on active substrate 41), and insulating or semi-insulating layer 54 disposed between electrodes 53 and 8. Thus, layer 53 has three functions. First, layer 53 in stack 45 functions as a select address line (21–26), second as part of the black matrix system, and third as one of the TFD electrodes.

This design is unique and an improvement over the prior art, as each stack 45 portion on substrate 41 includes each of black matrix stack system 47, conductive address line 53, and thin film diode structure (8, 53, 54). In such a manner, the display can be manufactured in fewer steps, as no black matrix is required on passive substrate 43. The transmissive display can also have reduced reflection characteristics in high light ambient environments due to the black matrix structure 47, less valuable transmission space is wasted, photosensitivity is improved, the problem of breakdown voltage in the diode 10, 11 devices is eliminated as there are no step areas in the diodes, and the pixel aperture ratio of the display can be substantially increased because pixel electrode 8 on substrate 41 overlaps at least a substantial portion of the color filter 61 and the select address lines in each pixel. Since the color filters 61 and pixel electrodes 8 overlap select lines 21–26 (line 53 in FIG. 7), a high aperture of at least about 70% (preferably at least about 85%) can be obtained for the backlit display. For an embodiment where only one TFD is utilized per pixel, an aperture of at least about 85% or 90% can be achieved for the display.

Figure 8:
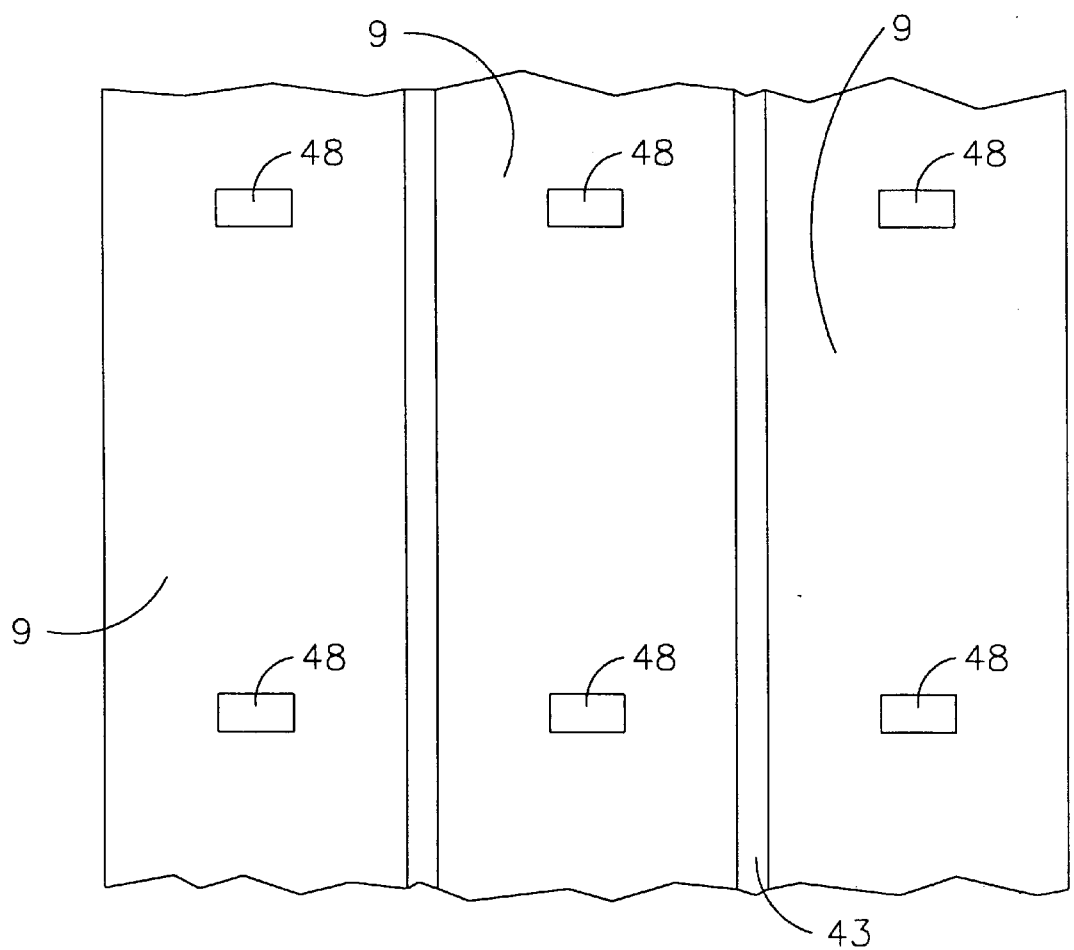
FIG. 8 is a top plan view of the passive substrate, illustrating the date address lines for the display of FIGS. 2, 5, and 7.

As shown in FIGS. 7–8, on passive substrate 43, pixel electrode (e.g. ITO) columns 9 which are parallel to one another are patterned as shown in FIG. 8, and a metal 48 may be patterned on layer 9 in areas above and corresponding to each TFD 10, 11 on the active substrate so that the TFDs 10, 11 on active substrate 41 are substantially shielded from visible light rays from backlight 39. This additional opaque metal 48 (e.g. Cr, Mo, Al, etc.) will virtually eliminate photocurrents in silicon rich silicon nitride diode devices 10, 11 and thus improves contrast ratio and gray scale uniformity of the display.

Referring to FIG. 7, black matrix system 47 corresponding with and patterned with each select address line 21–26 in the display, will be described as follows. Layers 49, 50, and 51 may each be of silicon oxynitride ($SiO_xN_y$) according to certain embodiments of this invention. Layer 52 may be of amorphous silicon (or of some other light absorbing material) in certain embodiments, while layer 53 may be of a reflective opaque metal. Black matrix system 47 is made up of layers 49–53, which are more thoroughly described in commonly owned U.S. Ser. No. 09/023,451, filed on Feb. 13, 1998, the disclosure of which is incorporated herein by reference.

Black matrix system 47 absorbs most ambient rays 36 impinging upon the display, and reflects very few of them thereby keeping the contrast of displayed images at acceptable levels. Preferably, the substrate 41 upon which the black matrix is mounted is located closest to viewer 37.

Black matrix system 47 is a multi-layer system. In certain embodiments, system 47 includes substantially transparent substrate 41, first 49, second 50, and third 51 $SiO_xN_y$ layers, light absorbing (e.g. a—Si semiconductor) layer 52, and opaque reflective metal (e.g. Mo, Cr, or MoTa) layer 53. Thus, black matrix system 47 is positioned between liquid crystal layer 7 and substrate 41. For low black matrix ambient reflection, system 47 has a refractive index of from about 1.5 to 1.7 adjacent substrate 41 that matches or substantially matches the index of the material (e.g. glass) of substrate 41 at the interface between the substrate and the matrix (i.e. layer 49 has a refractive index of from about 1.5–1.7 adjacent substrate 41), and the different adjacent layers of system 47 in some embodiments have indices of refraction that substantially match one another in order to reduce reflections, with the indices gradually increasing as the layers get further and further away from substrate 41. The gradual, as opposed to sudden, shifting of refractive indices in system 47 as the layers progress away from substrate 41 toward metal or conductive opaque layer 53, minimizes ambient reflections off of black matrix system 47 and allows fine tuning of the characteristics of system 47.

Black matrix layering system 47 has at least the following advantages: (i) the refractive index of the silicon oxynitride areas/layers 48–51 can be varied or change gradually between about 1.5 (glass substrate) and 4.5 by varying "x" and "y" of the $SiO_xN_y$ (silicon oxynitride) layers 49–51. The x and y parameters of silicon oxynitride layers 49–51 can be varied by changing gas ratios of $SiH_4/NH_3/N_2O/H_2/N_2/O_2$ in the PECVD (plasma enhanced chemical vapor deposition) process used to deposit silicon oxynitride layers 49–51 on substrate 41 although in many embodiments, $H_2$, $N_2$, and $O_2$ may not be used; (ii) the light absorption coefficient of system 47 can also be varied by changing x and y of silicon oxynitride layers 49–51; (iii) for silicon oxynitride ($SiO_xN_y$) there are multiple parameters (e.g. x and y) that can be varied, as compared to either silicon nitride ($SiN_x$) or silicon oxide ($SiO_x$) which only have one parameter (x) to vary, thereby maximizing the flexibility of design and potential efficiency of the system of this invention; (iv) silicon oxynitride can be dry etched in plasma such as $CF_4/O_2$, $SF_4/O_2$, or any other known plasma thereby making it easier to manufacture; (v) silicon oxynitride ($SiO_xN_y$) portions of system 47 are multi-layer in effect and thus can be formed with abrupt interfaces ($SiO_{x1}N_{y1}/SiO_{x2}N_{y2}/\ldots/SiO_{xn}N_{yn}$) between layers 49–51, or with gradual interfaces ($SiO_{x(t)}N_{y(t)}$) between layers 49–51. In the case of abrupt interfaces, the RF power is turned off between each layer 49–51 so that the gas ratio can be changed from layer to layer; thus each layer 49, 50, and 51 has independent and different but substantially constant x and y values in abrupt embodiments. In the case of gradual interfaces between layers 49–51, the RF power of the CVD apparatus remains on during deposition of the silicon oxynitride layers 49–51 while the gas ratios are changed thereby resulting in a smooth transition of x and y values between layers 49–51; thus, the x and y values in the silicon oxynitride layer(s) are functions of time in gradual interface embodiments of this invention. In gradual interface embodiments, the change of x and/or y in the silicon oxynitride layers 49–51 may be approximately linear as a function of time throughout the entirety of all layers 49–51, or optionally may be curvalinear as a function of time throughout layers 49–51, or optionally may only vary as a function of time near the interfaces so that a substantial portion of each layer 49, 50, and 51 has a substantially constant x and/or y value, and proximate interface areas these layers have x and/or y values that vary as a function of time. Further advantages include the fact that silicon oxynitride film for layers 49–51 can be deposited by other thin film deposition methods such as sputtering or vapor deposition. Black matrix 47 reflection can be optimized (i.e. minimized) by varying refractive index, absorption coefficient, and the thickness of each silicon oxynitride layer 49, 50, and 51 (by changing "x," "y," and/or thickness).

In certain embodiments of this invention, each of layers 49–51 is of silicon oxynitride, with first deposited layer 49 being from about 5 to 200 nm thick (preferably from about 70 to 90 nm thick, and most preferably about 80 nm thick), second deposited layer 50 being from about 5 to 500 nm thick (most preferably from about 40 to 200 nm thick), and third deposited layer 51 being from about 10 to 500 nm thick (preferably from about 30 to 70 nm thick, and most preferably about 50 nm thick). Although in the FIG. 7 embodiment, only three silicon oxynitride layers 49–51 are illustrated, the number of such layers may range from as low as one or two up to as many as ten or more.

In the FIG. 7 embodiment, absorbing layer 52 may be of amorphous silicon (a—Si) or of a—Si rich silicon oxynitride. Amorphous silicon is a material which tends to absorb more light than do any of layers 49–51, although the absorption coefficient of layers 49–51 can be adjusted upward or downward by varying x and/or y in each of the silicon oxynitride layers. Absorption layer 52 may be from about 50 to 600 nm thick, preferably from about 200 to 300 nm thick. Overlying opaque metal layer 53 (e.g. of MoTa) may be from about 200–700 nm thick, preferably from about 200–400 nm thick.

As substrate 41 is closest to viewer 37, and substrate 43 is closest to backlight 39, ambient light 36 reaching the display proceeds through substrate 41 and hits layers 49–51. Each of layers 49–51 provides some absorption of visible light, and their gradually changing refractive indices minimize ambient reflection off of black matrix system 47. Part of ambient light 36 passes through layers 49–51 and reaches absorption layer 52 and reflective opaque layer 53. Layer 52 functions to absorb a substantial amount of visible light which impinges thereon (e.g. more than about 60%, and preferably more than about 80%). For example, a—Si mostly absorbs blue and green visible light, but does transmit small amounts of red light. The light which gets through absorbing layer 52 then hits opaque metal layer 53 (which also functions as a select line 21–26) which reflects a substantial portion of the light. The reflected light again is mostly absorbed by layer 52 and further absorption of reflected rays is performed by layers 49–51. In such a manner, system 47 appears substantially "black" in color to the naked eye and can achieve visible ambient light reflection (e.g. including 550 nm light rays) of less than about 1.0%, preferably less than about 0.80%, more preferably less than about 0.60%, and most preferably less than about 0.40%, in certain embodiments. The use of the term "black" in the matrix system 47 does not mean that everything is purely black in color, but only that system 47 is substantially opaque to most visible wavelengths and reflects little ambient light and functions in a black matrix manner as known in the art. A specific example of the n and k values of an exemplary black matrix system 47 may be found in Ser. No. 09/023,451, the disclosure of which is incorporated herein by reference. The refractive index between layers 49–51 can be changed between about 1.5 and 4.0 by varying "x" and/or "y" of the silicon nitride in each of layers 49–51. This varying of x and/or y is done by changing the gas ratios. By minimizing change of refractive indices "n" between the immediately adjacent black matrix layers by varying x and y in layers 49–51, layer 49 can have a refractive index substantially matched to glass substrate 41 (e.g. from about 1.5 to 1.7), while layer 50 has a slightly higher refractive index (e.g. from about 1.7 to 2.0) that substantially matches that of layer 49, while third layer 51 has a slightly higher refractive index (e.g. about 3.0) that is relatively close to both that of layer 50 and that of layer 52; and finally absorbing layer 52 can be deposited so that its refractive index differs from that of adjacent layer 51 by no more than about 1.4, preferably by no more than about 1.0. Opaque or metal layer 53 may be deposited over layer 52 so that its refractive index substantially matches that of layer 52. In certain embodiments, the refractive index of adjacent layers in system 47 does not vary by more than about 1.0, and the "k" value of adjacent silicon oxynitride layers 49–51 does not vary by more than about 0.15 (i.e. $\Delta k$ is less than or equal to about 0.15 for immediately adjacent silicon oxynitride layers).

According to certain other embodiments of this invention, layers 49–51 may be of material other than silicon oxynitride that behaves in a similar manner and includes at least two subscript parameters that can be varied (e.g. x, y, etc.). In view of the above, it is clear that black matrix system 47 according to different embodiments of this invention may be made by depositing at least two, and preferably at least three separate layers/portions of $AB_xC_x$ successively, where A, B, and C are different chemical elements, and where "x" and/or "y" are varied from layer/portion to layer/portion in order to cause each layer/portion of $AB_xC_y$ to have a different refractive index and a different "k" value. In certain preferred embodiments of this invention, A is silicon, B is oxygen, and C is nitrogen, although it is envisioned that other materials can be used. Varying n and k of different silicon oxynitride layers 49–51, sometimes in combination with varying the thicknesses of any or all of such layers, enables very low ambient reflections less than or equal to about 1% in the visible 380–760 nm wavelength range.

For exemplary purposes, a method of making a transmissive normally white (NW) display in accordance with FIGS. 2–7 will now be described according to a particular embodiment of this invention. Firstly, substantially transparent substrate 41 is provided. Substrate 41 may be made of glass in certain embodiments and have an index of refraction of about 1.5. First black matrix layer 49 is deposited as a continuous sheet on substrate 41. Thereafter, second black matrix layer 50 is deposited as a continuous sheet on substrate 41 over layer 49. Thereafter, third black matrix layer 51 is deposited as a continuous sheet on substrate 41 over layers 49 and 50. An absorbing layer 52 (e.g. a—Si) is then deposited as a continuous layer on substrate 41 over top of layers 49–51. Then, a reflective, conductive, and opaque metal inclusive layer 53 (e.g. of MoTa) is deposited on substrate 41 over top of layers 49–52. Thereafter, a continuous diode insulating or semi-insulating layer 54 (e.g. of silicon rich silicon nitride) is deposited on substrate 41 over top of layers 49–53. At this point in the process, each of layers 49–54 is in the form of a continuous sheet extending across most if not all of substrate 41.

Layers 49–54 will then be patterned, preferably in one photomask step, to form elongated stacks 45 which make up both elongated select lines 21–26 and elongated floating low reflectance portions 42. A photoresist layer may be applied to the upper surface of layers 49–54, on top of layer 54. The photoresist may be patterned by exposure and developing equipment so as to cover only those areas of layers 49–54 which are to remain on substrate 41, i.e. the portions which will correspond in location to select lines 21–26 and portions 42 will be covered with the photoresist. After this photoresist layer has been applied and patterned on top of layers 49–54, then the uncovered portions of layers 49–54 may be etched away via either wet etching or dry etching (e.g. RIE) so as to result in stacks 45 (see FIG. 7) which extend across substrate 41 and correspond to select lines 21–26 and portions 42. Thus, stacks 45 now extend in rows 21–26 and floating columns 42 across substrate 41. Columns 42 are not in electrical communication with rows 21–26.

As discussed above, conductive layer 53 in each row stack functions as the voltage/current conductor and thus as a select address line 21–26. Layer 54 in each row stack 45 functions as the insulator or semi-insulator for corresponding thin film (e.g. MIM) diodes 10, 11. Layers 49–53 in combination form a black matrix system in both the row 21–26 and column 42 stacks to prevent or minimize ambient light 36 reflections off of the front of the display during ambient conditions. Thus, in row stacks layer 53 functions in three different ways, it acts as a select address line 21–26, as one of electrodes for corresponding thin film diodes, and as part of the black matrix system 47 in each stack 45. The use of layer 53 for these three different purposes results in a more efficiently made display, and lessens the number of process steps needed to make the display.

At this point in the process, we have a plurality of select row lines (formed by stacks 45) 21–26 extending across substrate 41. Now, a photoimageable color filter layer of a first color (e.g. red color filter) is deposited as a continuous layer across substrate 41 over row 21–26 and column 42 stacks 45, and thereafter is patterned via photoimaging to form a first array of color filters (e.g. red) with vias or contact holes 71 therein. The first array of color filters is then cured to allow crosslinking of the polymer filters. Then, a second photoimageable color filter layer (e.g. green) is deposited across substrate 41 over top of stacks 45 and over top of the cured first array of color filters, with the second color filter layer thereafter being patterned by photoimaging so as to have formed the array of the second colored filters (e.g. green filters) with vias 71 therein. The second array of filters are then cured. Thereafter, a third photoimageable color filter layer (e.g. blue) is deposited on substrate 41 as a substantially continuous sheet over top of stacks 45 and the already patterned first and second color arrays of filters, with this third color filter layer (e.g. blue) being patterned via photoimaging to form an array of the third colored filters 61 including vias 71 defined therein on substrate 41. At this point in the process, upon substrate 41 we have rows 21–26 of stacks 45, columns 42 of stacks 45, as well as three different arrays of different colored filters on the substrate. Each filter 61 has patterned hereinto a contact hole or via 71. In FIG. 7, element 61 refers to a portion of one such color filter in one pixel.

Two separate contact holes or vias 71 are formed in each color filter portion, because two MIM diodes are provided in each pixel. The size of each via 71 adjacent layer 54 defines the area or size of the TFD. Each via 71 corresponds to the position of a TFD 10, 11. Because the color filters 61 are preferably of photoimageable material, having a dielectric constant value of less than about 5.0, and preferably less than about 3.5, photoimaging may be used to both pattern all of the color filters, and to form contact holes 71 therein.

In order to pattern the color layers into filters 61 and form contact holes 71 therein, a mask may be used and ultraviolet (UV) rays (e.g. i-rays of 365 nm) may be used to irradiate areas of the color filter layers which are to remain, so that non-exposed or non-radiated areas of the color filters are removed in developing. Thus, the areas of the color filter layers (which act as negative resist) which correspond to contact holes 71 and filters 61 are not exposed to UV radiation, while the rest of the continuous color filter layers across the substrate are exposed to UV radiation. Following exposure, the color filter layers are developed by using a known solution at a known concentration. In the developing stage, the areas of the color filter layers corresponding to vias 71 and elongated areas between filters 61 are removed (i.e. dissolved) so as to form the vias or contact holes 71 and the color filters 61. After developing, the color filters 61 are cured or subjected to post-baking (e.g. about 240° C. for about 1 hour) to eliminate the solvent so that the filters 61 with vias 71 therein are resinified. Thus, no dry or wet etching is needed. IN certain embodiments of this invention, contact holes 71 in filters 61 may each be of a size of approximately 10×10 $\mu$m (this via 71 size approximately defines the size of the TFD 10, 11). According to alternative embodiments, the color filter layers may act as positive resist as opposed to negative resist. In certain alternative embodiments, contact holes 71 and filters 61 may be patterned and formed by etching.

After the color filters 61 have been patterned and contact holes 71 formed therein, a substantially transparent conducting layer (e.g. indium tin oxide or ITO) which results in pixel electrodes 8 is deposited in the form of a sheet, and thereafter patterned (e.g. photomasked and etched) on substrate 41 over top of the color filters 61. After patterning of this substantially transparent conducting layer, pixel electrodes 8 are left as shown in FIG. 7, with the patterned pixel electrode 8 for each pixel contacting a pair of layers 54 through the two contact holes 71 provided in that pixel. Thus, in each pixel, pixel electrode 8 on active substrate 41, together with electrode layers 53 and semi-insulator layers 54, forms the pair of bidirectional threshold thin film diodes 10, 11 in each pixel. Accordingly, conductive layer 8 functions as both the active plate pixel electrode layer and as one of the electrodes for each thin film diode 10, 11 in each pixel.

In certain embodiments, in each pixel, the pixel electrode 8 directly contacts the corresponding two semi-insulating layers 54 through the two vias 71 in the color filter 61. In embodiments where only one TFD is provided per pixel, then electrode 8 would only directly contact one semi-insulating layer 54 and only one via 71 would be provided in each filter 61. It is noted that instead of each pixel electrode 8 directly contacting layer 54 through each via 71, in alternative embodiments there may be provided an additional conductive layer which can be disposed in between the pixel electrode 8 and layer 54, with this additional conductive layer enabling the pixel electrode to still electrically communicate with layer 54 and thereby to still form the TFD in conjunction with layers 53 and 54.

The passive plate must also be formed. For purposes of simplicity, the passive plate may be formed by providing substantially transparent substrate 43 and columns 9 of corresponding electrodes 9 patterned thereon as shown in FIG. 8. These conductive continuous column strips 9 shown in FIG. 8 which are formed on the passive substrate are preferably of substantially transparent material such as ITO (indium-tin-oxide). Also, elongated electrodes 9 on the passive substrate 43 function as both the pixel electrodes on the passive plate and as column or data lines 31, 32, etc. In certain embodiments, column lines 9 (31, 32) which also function as the passive plate pixel electrodes are patterned into strips as shown in FIG. 8 so that each strip may be approximately as wide as the corresponding pixel electrode 8 on the other substrate. Thus, for example, when a 10.4 inch diagonal VGA display is made, having 480×640 pixels (times three for the number of total colored pixels), with about a 110×330 pixel pitch, the data lines 9, 31, 32 may be about 100 $\mu$m wide, the select lines 21–26 (and thus stacks 45) from about 10–20 $\mu$m wide. On the passive substrate, there may be a gap of from about 5–20 $\mu$m between adjacent data lines/electrodes 9, preferably the gap is about 10 $\mu$m given the pixel pitch aforesaid. Electrodes 8 and 9 interact across liquid crystal layer 7 so as to form the pixel electrodes of the display. An optional metal layer can be deposited and patterned on substrate 43 so as to form opaque shield portions 48 that are positioned on the passive plate so as to shield TFDs 10, 11 from backlight rays 38.

After formation of the active and passive plates, liquid crystal layer 7 is disposed and sealed between the active plate and the passive plate as shown in FIG. 7. Although not shown, each of the active and passive plates also includes a polarizer and an orientation film as known in the art.

Thus, in certain embodiments of this invention, the total number of mask steps use in making the display is reduced. For the active plate, as few as five mask steps may suffice and for the passive plate as few as one or two mask steps is enough to make displays according to this invention (total of six or seven depending upon whether additional metal 48 is used on the passive plate). This total compares with, for conventional MIM displays, three steps for the active plate and five or six steps for the passive plate which includes the color filters (a total of eight or nine steps). Thus, in accordance with certain embodiments of this invention, the combination of performance improvements and overall process simplification makes the instant invention attractive for low cost, high performance LCDs for e.g. automotive and other applications.

Once given the above disclosure, many other features, modifications, and improvements will become apparent to the skilled artisan. Such other features, modifications, and improvements are, therefore, considered to be a part of this invention, the scope of which is to be determined by the following claims.

We claim:

1. A backlit liquid crystal display including an array of different colored pixels, the display comprising:

a first substrate having disposed thereon a plurality of substantially parallel elongated electrodes to which data signals are applied;

a second substrate which is an active substrate, said active substrate including thereon a plurality of substantially parallel first elongated layer stacks aligned in a first direction and a plurality of substantially parallel second elongated layer stacks aligned in a second direction, wherein said first direction is substantially perpendicular to said second direction, and wherein a plurality of said second elongated layer stacks are aligned substantially parallel to a plurality of said elongated electrodes to which data signals are applied;

a nematic liquid crystal layer disposed between said first and second substrates;

a backlight provided for emitting light toward said first and second substrates, and wherein said first substrate is disposed at a position between said backlight and said second substrate;

wherein each of said first elongated stacks includes at least one black matrix layer, a select line conductive layer which forms at least part of a select address line, and a semi-insulating thin film diode (TFD) layer;

a color filter in each of said pixels, and wherein in each pixel the corresponding color filter is positioned between said second substrate and said liquid crystal layer, and wherein each of said color filters includes at least one contact hole defined therein over a thin film diode area;

a substantially transparent pixel electrode provided for each pixel, wherein said pixel electrodes are provided on said second substrate so that in each pixel a substantial portion of the corresponding color filter is disposed between the pixel electrode and said second substrate;

each pixel electrode being in electrical communication with at least one corresponding semi-insulating thin film diode layer through one of said contact holes;

wherein in each of said first elongated layer stacks a non-linear resistance thin film diode is formed by at least the semi-insulating layer, the select line conductive layer, and a corresponding pixel electrode whereby each pixel includes at least one said thin film diode for selectively applying voltage to a corresponding pixel electrode in the pixel.

2. The display of claim 1, wherein in each of said first elongated stacks, said select line conductive layer is disposed between said semi-insulating layer and said at least one black matrix layer.

3. The display of claim 1, wherein said at least one black matrix layer in each said first elongated stack includes at least two layers including $AB_xC_y$ where A, B, and C are chemical elements.

4. The display of claim 1, wherein each of said color filters is photo-imageable and has a dielectric constant less than about 5.0.

5. The display of claim 4, wherein each of said color filters has a dielectric constant less than about 3.5.

6. The display of claim 1, wherein said select line layer in each of said first elongated stacks functions as each of a select address line, a reflective layer forming part of a black matrix system in the stack, and as an electrode for the corresponding thin film diode.

7. The display of claim 1, wherein in each pixel the pixel electrode directly contacts at least one semi-insulating layer through one said contact hole defined in a color filter.

8. The display of claim 1, wherein the display has a pixel aperture ratio of at least about 70%.

9. The display of claim 8, wherein the display has a pixel aperture ratio of at least about 85%.

10. The display of claim 1, wherein said thin film diode is a MIM diode.

11. The display of claim 1, wherein first and second of said thin film diodes are provided for addressing each pixel in the display, and wherein each color filter has first and second of said contact holes defined therein so that the pixel electrode in each pixel communicates with the first thin film diode through the first contact hole and with the second thin film diode through the second contact hole in each pixel.

12. In a liquid crystal display including a first substrate, a second substrate, a liquid crystal layer disposed between said first and second substrates, and a plurality of pixels for displaying an image to a viewer, the improvement comprising:

at least one of the pixels including a first thin film diode and a color filter each disposed on said second substrate, wherein said first thin film diode includes a first electrode, a second electrode, and a semi-insulator layer disposed between said first electrode and said second electrode;

wherein said color filter has a first contact hole defined therein, and a pixel electrode in said at least one pixel being in electrical communication with said first thin film diode through said first contact hole;

wherein said pixel electrode and said second electrode are in electrical communication with one another, so that said pixel electrode in said at least one pixel functions as both the pixel electrode and is electrically connected through said first contact hole with said second electrode of said first thin film diode; and wherein said pixel electrode is substantially transparent to visible light, and wherein said pixel electrode directly contacts said semi-insulator layer through said first contact hole so as to form said first thin film diode, and wherein said first thin film diode is a non-linear resistance element, and wherein said color filter is photo-imageable and has a dielectric constant value of less than about 5.0.

13. In the display of claim 12, wherein in said at least one pixel at least a substantial portion of said color filter is disposed between said pixel electrode and said second substrate, and wherein said color filter is photo-imageable.

14. In the display of claim 12, said at least one pixel further including a second thin film diode and said color filter further including a second contact hole defined therein, and wherein said first contact hole is located proximate and adjacent said first thin film diode and said second contact hole is located proximate and adjacent said second thin film diode, and wherein said first and second thin film diodes are non-linear resistance elements.

15. In the display of claim 14, wherein said first and second thin film diodes are MIM diodes.

16. In the display of claim 14, wherein a first plurality of black matrix layers are located between said first thin film diode and said second substrate, and a second plurality of black matrix layers are located between said second thin film diode and said second substrate.

17. In a liquid crystal display including a first substrate, a second substrate, a liquid crystal layer disposed between said first and second substrates, and a plurality of pixels for displaying an image to a viewer, the improvement comprising:

at least one of the pixels including a first thin film diode and a color filter each disposed on said second substrate, wherein said first thin film diode includes a first electrode, a second electrode, and a semi-insulator layer disposed between said first electrode and said second electrode;

wherein said color filter has a first contact hole defined therein, and a pixel electrode in said at least one pixel being in electrical communication with said first thin film diode through said first contact hole;

said at least one pixel further including a second thin film diode and said color filter further including a second contact hole defined therein, and wherein said first contact hole is located proximate and adjacent said first thin film diode and said second contact hole is located proximate and adjacent said second thin film diode, and wherein said first and second thin film diodes are non-linear resistance elements;

wherein a first plurality of black matrix layers are located between said first thin film diode and said second substrate, and a second plurality of black matrix layers are located between said second thin film diode and said second substrate; and wherein said second thin film diode, like said first thin film diode, includes a first electrode, a second electrode, and a semi-insulator layer disposed between said first and second electrodes, and wherein said first electrode of said first thin film diode and said first electrode of said second thin film diode each function as both a first electrode of one of the thin film diodes and also as a reflective layer in a multi-layer black matrix system.

18. In the display of claim 17, wherein an a—Si absorbing layer is disposed between the first electrode and said second substrate in each of said first and second thin film diodes.

19. A liquid crystal display including at least one colored pixel, the display comprising:

a first substrate having disposed thereon a plurality of substantially parallel elongated electrodes to which data signals are applied;

a second substrate which is an active substrate, said active substrate including thereon a plurality of substantially parallel first elongated layer stacks aligned in a first direction and a plurality of substantially parallel second elongated layer stacks aligned in a second direction, wherein said first direction is substantially perpendicular to said second direction, and wherein a plurality of said second elongated layer stacks are aligned substantially parallel to a plurality of said elongated electrodes to which data signals are applied;

a nematic liquid crystal layer disposed between said first and second substrates;

wherein a plurality of said first elongated stacks include at least one black matrix layer, a select line conductive layer which forms at least part of a select address line, and a semi-insulating thin film diode (TFD) layer;

a color filter of said pixel positioned between said second substrate and said liquid crystal layer, said color filter including at least one contact hole defined therein over a thin film diode area;

a substantially transparent pixel electrode provided in said pixel, wherein said pixel electrode is provided on said second substrate so that a substantial portion of said color filter is disposed between the pixel electrode and said second substrate;

said pixel electrode being in electrical communication with at least one corresponding semi-insulating thin film diode layer through said contact hole; and wherein in at least one of said first elongated layer stacks a non-linear resistance thin film diode is formed by at least the semi-insulating layer, the select line conductive layer, and a corresponding pixel electrode whereby said pixel includes at least one said thin film diode for selectively applying voltage to said pixel electrode in the pixel.

\* \* \* \* \*